J. GALLEAZZI.
COUPLING MECHANISM FOR ORGANS.
APPLICATION FILED MAY 12, 1914.
1,133,555.
Patented Mar. 30, 1915.
4 SHEETS—SHEET 1.
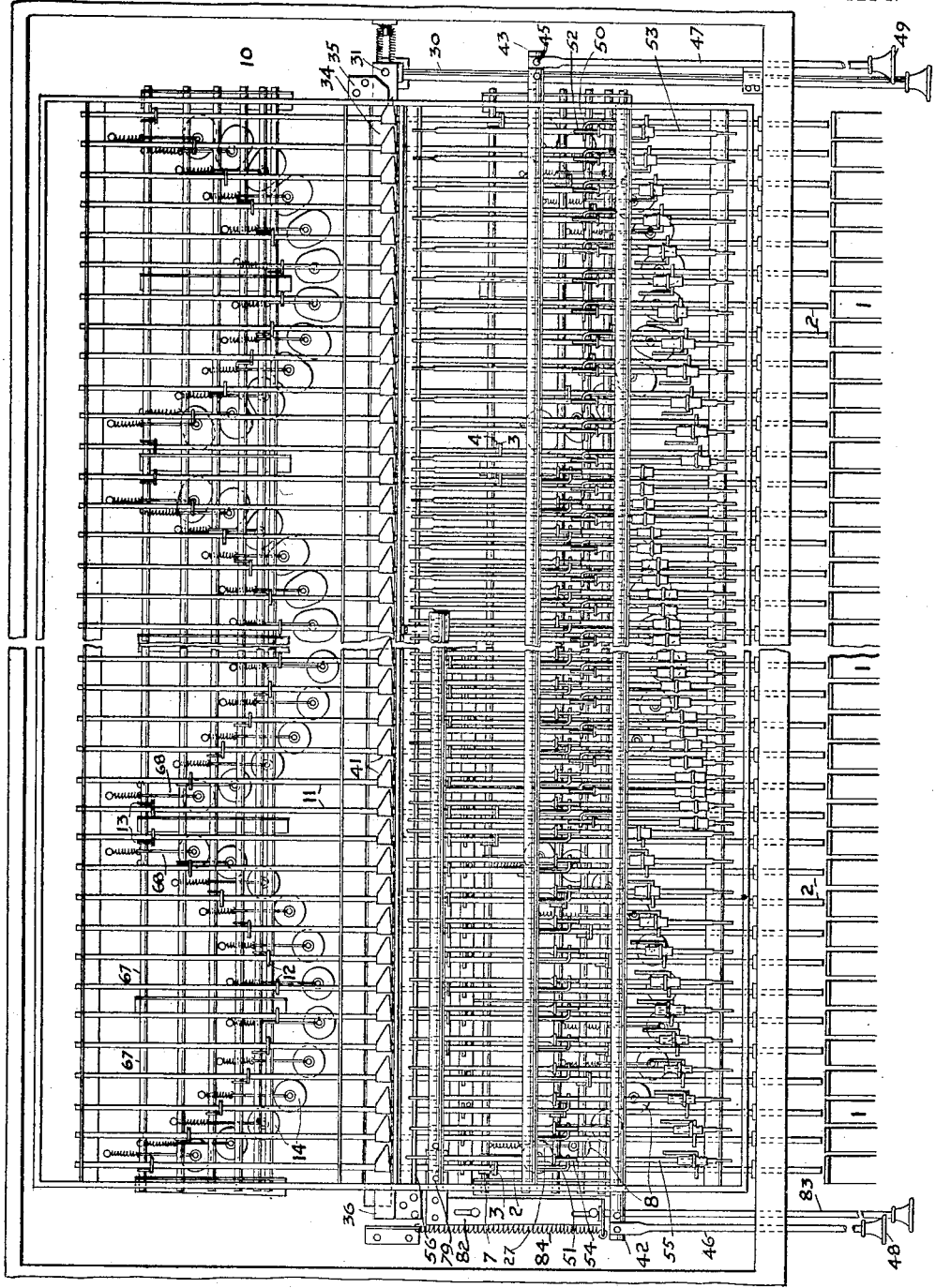
WITNESSES
G. M. Ball
Léon Boillot
INVENTOR
JOSEPH GALLEAZZI
By Francis M. Wright,
ATT'Y.

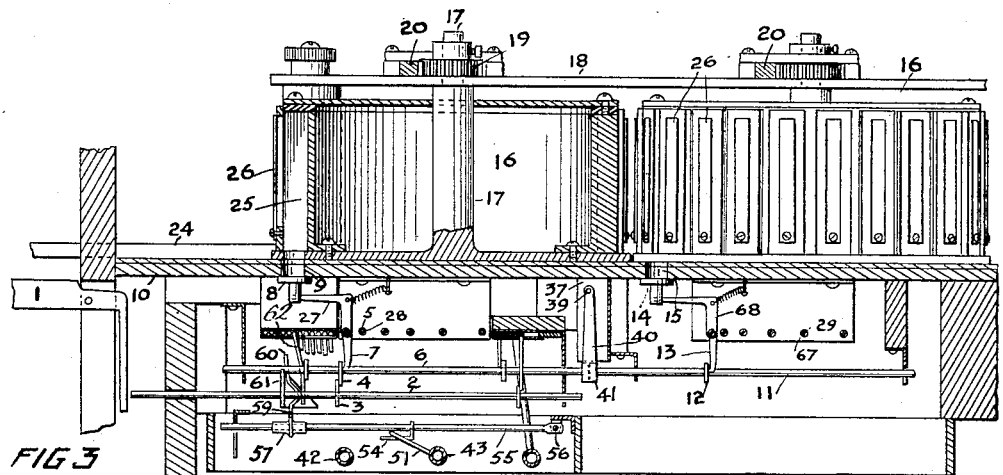

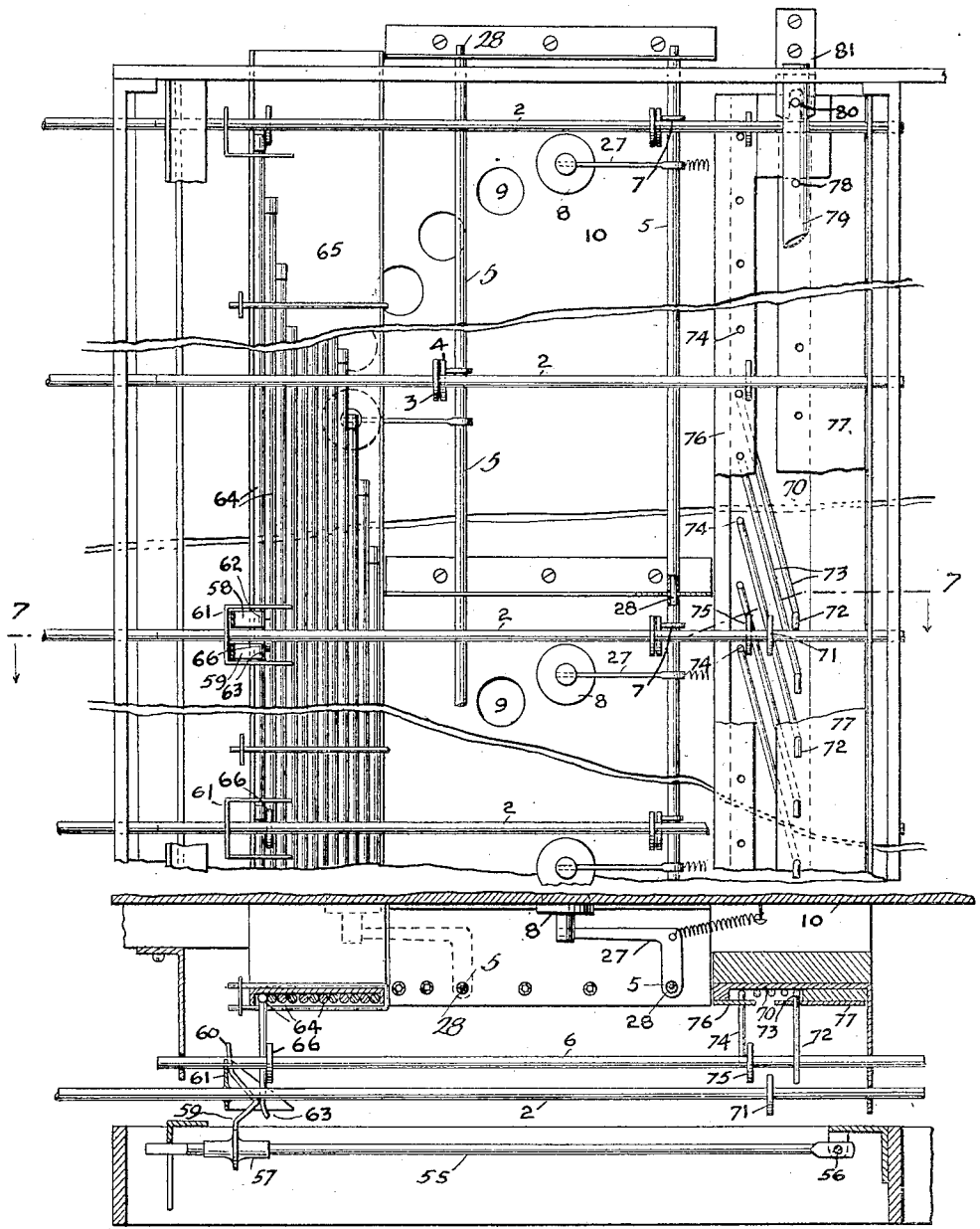

J. GALLEAZZI.
COUPLING MECHANISM FOR ORGANS.
APPLICATION FILED MAY 12, 1914.
1,133,555.
Patented Mar. 30, 1915.
4 SHEETS—SHEET 4.
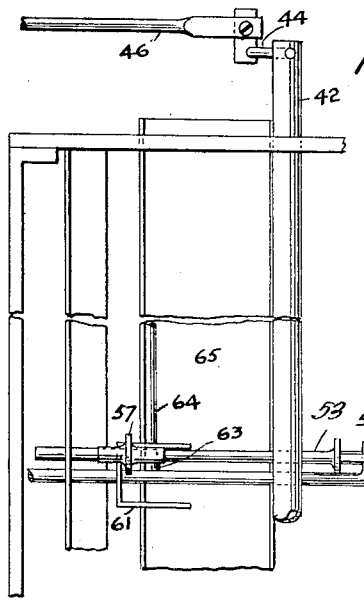
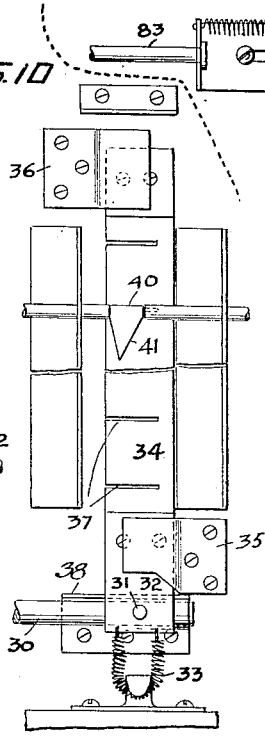
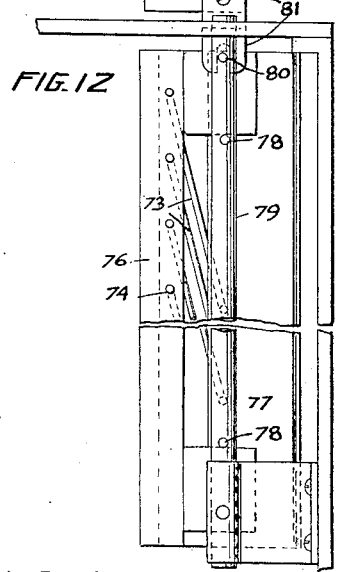
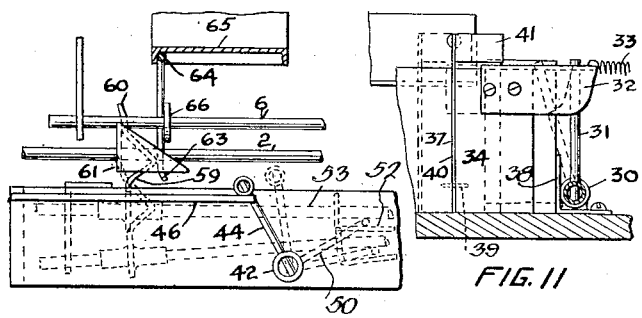
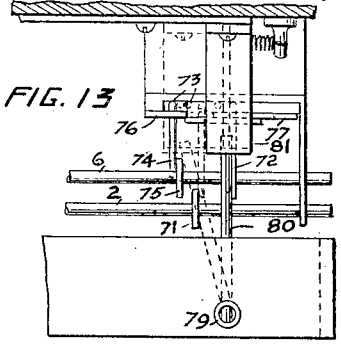
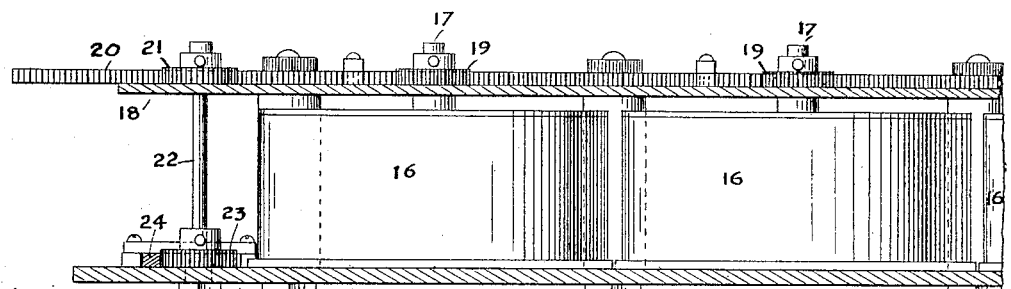
WITNESSES
G. M. Ball
Léon Borello
INVENTOR
JOSEPH GALLEAZZI
By Francis M. Wright
ATT'Y

UNITED STATES PATENT OFFICE.

JOSEPH GALLEAZZI, OF SAN FRANCISCO, CALIFORNIA.

COUPLING MECHANISM FOR ORGANS.

1,133,555.  Specification of Letters Patent.  Patented Mar. 30, 1915.

Application filed May 12, 1914.  Serial No. 838,047.

*To all whom it may concern:*

Be it known that I, JOSEPH GALLEAZZI, a citizen of the United States, residing at San Francisco, in the county of San Francisco and State of California, have invented new and useful Improvements in Coupling Mechanism for Organs, of which the following is a specification.

The object of the present invention is to provide, in either a reed or a pipe organ, mechanism for coupling either the octave above or the octave below, or both, and the major third, with or without said octaves.

In the accompanying drawings, Figure 1 is a broken bottom plan view of a sounding board of an organ, showing my improved mechanism; Fig. 2 is a broken transverse vertical section thereof; Fig. 3 is a view similar to Fig. 2, upper parts being omitted, and parts being shown in a different position; Fig. 4 is a view similar to Fig. 3, showing parts in still another position; Fig. 5 is a view similar to Fig. 3 showing parts in still another position; Fig. 6 is an enlarged broken detail plan view of a portion of the mechanism; Fig. 7 is a broken vertical section on the line 7—7 of Fig. 6; Fig. 8 is a broken bottom plan view of a detail; Fig. 9 is a vertical section of the same; Fig. 10 is a broken bottom plan view of a detail; Fig. 11 is an inverted vertical section of said detail; Fig. 12 is a broken bottom plan view of another detail; Fig. 13 is a vertical section of the same; Fig. 14 is a longitudinal section of the upper portion of the apparatus.

Referring to the drawings, 1 (Figs. 1–5) indicates keys of an organ, adapted to actuate rods 2, extending transversely of the organ and slidable in their longitudinal direction, said rods having secured thereto disks 3, adapted to engage disks 4 on rods 6, parallel with the rods 2, and also slidable in their longitudinal direction, which disks 4 can engage fingers 7 on tubes 5, rotatable on rods 28, (Figs. 6 and 7) said tubes carrying spring-retracted arms 27, the outer ends of which are attached to valves 8, which close holes 9 in the sounding board 10 of the organ. These holes are in semi-circular series, one for each octave, there being twelve holes in each series, corresponding to the twelve notes of the octave. In line with the rods 6 are rods 11 at the back of the organ, having thereon disks 12 which can engage ends of fingers 13, on rotary tubes 29 on rods 67 and to which are attached spring-retracted arms 68 which are attached to valves 14 which close holes 15 in said sounding board, the holes 15 being also arranged in semi-circular series, one for each octave. Over said series of holes, at both front and back, are arranged corresponding cylindrical reed carriers 16, (Figs. 2, 14), one for each series, said carriers having shafts 17 passing through bearings in a fixed plate 18, said shafts having above said plate gear wheels 19 which are actuated by racks 20, which are actuated by gear wheels 21 on vertical shafts 22, which carry gear wheels 23 actuated by a rack 24 extending from front to rear of the organ. Each reed carrier has twenty-four chambers 25, each closed by a reed 26, the twenty-four reeds giving the sounds corresponding to the twelve notes of an octave, the six notes next above the octave, and the six notes next below the same. It will be seen that by moving the rack 24 to the front or rear of the organ, all of said reed carriers 16 can be turned to bring any desired chambers over the holes 15 of the sounding board, and thus transpose through any interval desired.

30 (Figs. 1, 10, 11) indicates a transverse rock shaft at the bass end of the sounding board, from which an arm 31 extends through a hole in a plate 32 retracted by a spring 33, said plate being secured to a slide-piece 34, guided by guides 35 and 36, and having a series of transverse vertical slots 37 (Figs. 10, 11). The arm 31, abutting against a stop 34, limits the longitudinal movement of the slide-piece 38. In said slots 37 are pivoted, as shown at 39, (Figs. 2, 3, 11) hangers 40, to the lower ends of which, depending below said slide-piece, are secured wedges 41, which are interposed between the rods 6 and 11. When said rock shaft 30 is operated to move the slide to the right, said wedges are withdrawn from between the rods 6 and 11, so that the second series of valves are not actuated with the first series, and no sound is produced from the reeds in the rear series. But when the rock shaft is not so operated, then the spring 33 draws the slide to the left, and the thick portions of said wedges are between said rods 6 and 11, so that the actuation of the front rods 6 also effects the actuation of the rear rods 11, and both series of reeds are sounded simultaneously.

Extending beneath the rods 6 are longitudinal rock shafts 42, 43. The rock shaft 42 has a crank arm 44 at the treble end of the key board, and the rock shaft 43 has a crank arm 45 at the bass end. To these crank arms are pivotally connected pitmen 46, 47, respectively, which extend to the front of the organ, and can be operated by suitable draw-stops 48, 49. From the rock shaft 42 extend rearwardly hooked fingers 50, (Figs. 1, 8, 9) and from the rock shaft 43 extend forwardly hooked fingers 51 (Figs. 1, 2, 5). The fingers 50 are adapted to engage rearwardly extending fingers 52 (Figs. 1, 8, 9) on pivoted arms 53, and the fingers 51 are adapted to engage forward extending fingers 54 on pivoted arms 55 (Figs. 1, 2, 5). The rear ends of said arms 53, 55, are pivoted on a longitudinal rod 56. There is one arm 53 and one arm 55 for each of the rods 2. Around said arms 53 and 55 are slides 57 from which extend upwardly fingers 58, 59, having oblique upper ends 60. These fingers extend on opposite sides of the rod 2, and respectively between a U-shaped guard 61, (Fig. 6), secured to said rod 2 and arms 62, 63, depending on opposite sides of said rod 2 and received within the U-shaped guard 61. Said arms are formed integral with and are bent from opposite ends of longitudinal wire rock shafts 64 (Figs. 6, 7) retained in channels 65. Said arms also extend on opposite sides of disks 66 secured to the rods 6. As a result of this construction, should, for instance, the rock shaft 42 be operated to raise the fingers 59, as shown in Fig. 2, and insert their upper oblique ends between the guards 61 and the arms 62 on the right-hand side of the rods 2, then, when the rod 2 is actuated, as shown in Fig. 3, the arm 62 on one end of the rock shaft 64 and adjacent to said rod will also be actuated, and the arm 63 on the other end of said rock shaft 64 and on the side of the rod corresponding to the octave above (Figs. 6, 7) will also be actuated, and thereby the disk 66 will be actuated, and so will also the rod 6, and the octave above will be sounded. Similarly if the rock shaft 43 be actuated to insert the fingers 58 between the guards and the arms, then the octaves below will be sounded. If both are operated then both octaves will sound, if neither, then neither.

Of course it will be understood that the parts necessary to sound the octaves above the highest octave of the key board are omitted, as also to sound the octave below the lowest octave thereof, these parts being unnecessary.

I also provide means for playing with each note sounded the major third of that note. Such means comprise a disk 71 secured upon the rod 2 which can engage an arm 72 bent downwardly from one end of a wire rock shaft 73, in a channel 70 the other end of which is also bent downwardly to form an arm 74, which engages a disk 75 secured upon the rod 6 (Figs. 2, 6, 7, 12, 13). The arms 74 pass downwardly through holes in a fixed plate 76, while the arms 72 pass downwardly through holes in a plate 77, movable to and from the front of the organ by means of arms 78 extending upwardly from a longitudinal rock shaft 79, having an upwardly extending arm 80, (Fig. 12), the upper end of which is received in the lower forked end of a hanger 81 secured to a slide piece 82 adapted to be drawn forward by a rod 83 and retracted by a coiled spring 84.

I claim:—

1. The combination of a sounding board having holes, means for producing musical sounds by air currents through said holes, valves for closing said holes, slidable rods for operating said valves, key-operated rods for actuating the first-named rods, devices carried by said key-actuated rods, devices carried by said first-named rods, operative connections from the first devices to the second, means actuated by said first-named devices for operating valves other than those actuated by the first-named rods, and means for rendering operative or inoperative as desired the operative connections corresponding to the notes either above or below, at will, that correspond to the actuated key.

2. The combination of a frame, keys in said frame, slidable rods moved thereby, guards carried by said rods and extending on both sides of the same, levers pivoted on said frame, slides slidable upon said levers, fingers extending from said slides into proximity with said guards on opposite sides of said rods and having oblique portions, means for moving simultaneously all of said levers that carry fingers on one side of said rods, means for moving simultaneously all of said levers that carry fingers on the other side of said rods, rock shafts located to be actuated by the oblique portions of said fingers only when the latter are raised, means controlled by the rock shafts engaged by the fingers on one side of said rods for actuating valves controlling the production of lower tones, and means actuated by the rock shafts engaged by the fingers on the other side of said rods for actuating valves controlling the production of upper tones.

3. The combination of tone-controlling valves, slidable rods, means operated by said rods for actuating said valves, a channel bar, rock shafts therein, having bent arms at their ends, a fixed plate through holes in which the arms at one end of said rock shafts pass, and a movable plate through holes in which the arms at the other end of said rock shafts pass, means for actuating the arms at one end of said rock shafts by some of said slidable rods, and means for actuating the arms at the other ends of said rock shafts by others of said slidable rods corresponding to other valves.

In testimony whereof I have hereunto set my hand in the presence of two subscribing witnesses.

JOSEPH GALLEAZZI.

Witnesses:
 FRANCIS M. WRIGHT,
 D. B. RICHARDS.

Copies of this patent may be obtained for five cents each, by addressing the "Commissioner of Patents, Washington, D. C."